(12) United States Patent
Kroyzer et al.

(10) Patent No.: US 11,824,363 B2
(45) Date of Patent: Nov. 21, 2023

(54) METHODS AND SYSTEMS FOR SMOOTHING OUTPUT OF A SOLAR ENERGY SYSTEM

(71) Applicant: Solargik Ltd, Jerusalem (IL)

(72) Inventors: Gil Kroyzer, Jerusalem (IL); Israel Kroizer, Jerusalem (IL)

(73) Assignee: Solargik Ltd, Jerusalem (IL)

( * ) Notice: Subject to any disclaimer, the term of this patent is extended or adjusted under 35 U.S.C. 154(b) by 0 days.

(21) Appl. No.: 17/718,351

(22) Filed: Apr. 12, 2022

(65) Prior Publication Data

US 2022/0407313 A1 Dec. 22, 2022

Related U.S. Application Data

(60) Provisional application No. 63/202,584, filed on Jun. 17, 2021.

(51) Int. Cl.
*H02J 3/32* (2006.01)
*H02J 3/00* (2006.01)
*H02J 3/38* (2006.01)

(52) U.S. Cl.
CPC ............... *H02J 3/32* (2013.01); *H02J 3/004* (2020.01); *H02J 3/381* (2013.01); *H02J 2300/24* (2020.01)

(58) Field of Classification Search
CPC .... H02J 3/004; H02J 3/32; H02J 3/381; H02J 2300/24
USPC .......................................................... 307/52
See application file for complete search history.

(56) References Cited

U.S. PATENT DOCUMENTS

| 7,926,480 | B2 | 4/2011 | Le Lievre |
| 2010/0258110 | A1 | 10/2010 | Krabbe |
| 2014/0360555 | A1 | 12/2014 | Kim |
| 2016/0233679 | A1* | 8/2016 | Li ............................ F03D 9/255 |

(Continued)

FOREIGN PATENT DOCUMENTS

| CN | 104682435 A | 6/2015 |
| CN | 108110791 A | 6/2018 |

(Continued)

OTHER PUBLICATIONS

Co-pending U.S. Appl. No. 17/989,728 filed on Nov. 18, 2022.
(Continued)

*Primary Examiner* — Hal Kaplan
(74) *Attorney, Agent, or Firm* — Momentum IP; Marc Van Dyke

(57) ABSTRACT

A solar energy system comprising a photovoltaic array, an inverter, and an energy storage device is operated according to the following steps: (a) accessing irradiance data for a past time period; (b) acquiring an irradiance forecast for a future time period having a length of not more than 15 minutes and having a cumulative irradiance forecast of between 20% and 80% of clear-sky irradiance; (c) calculating a smoothed energy target-value for an imminent time step within the future time period, using the irradiance data for the past time period and the forecasted irradiance for the future time period; and (d) during the time step, delivering a quantity of energy to the inverter based on the calculated smoothed energy target-value. The energy storage device stores energy when more is produced than delivered, and discharges energy when more is delivered than is produced.

20 Claims, 9 Drawing Sheets

(56) References Cited

U.S. PATENT DOCUMENTS

| | | |
|---|---|---|
| 2018/0097126 A1 | 4/2018 | Gonatas |
| 2023/0039146 A1 | 2/2023 | Kroyzer |
| 2023/0044525 A1 | 2/2023 | Kroyzer |

FOREIGN PATENT DOCUMENTS

| | | |
|---|---|---|
| CN | 109787260 A | 5/2019 |
| WO | 2013/028661 A1 | 2/2013 |
| WO | 2017/112573 A1 | 6/2017 |
| WO | 2019/084454 A1 | 5/2019 |

OTHER PUBLICATIONS

Co-pending U.S. Appl. No. 18/072,778 filed on Dec. 1, 2022.
International Search Report for PCT/IB2022/061301 document completed Apr. 30, 2023.
Machine translation of CN104682435 (original document published in Chinese on Jun. 3, 2015).
Machine translation of CN108110791 (original document published in Chinese on Jun. 1, 2019).
Machine translation of CN109787260 (original document published in Chinese on May 21, 2019).
Sasmal RP, Sen S, Chakraborty A. Solar photovoltaic output smoothing: Using battery energy storage system. In2016 National Power Systems Conference (NPSC) Dec. 19, 2016 (pp. 1-5). IEEE.
Written Opinion for PCT/IB2022/061301 document completed Apr. 30, 2023.

\* cited by examiner

METHODS AND SYSTEMS FOR SMOOTHING OUTPUT OF A SOLAR ENERGY SYSTEM

CROSS-REFERENCE TO RELATED APPLICATIONS

This patent application claims the benefit of U.S. Provisional Patent Application No. 63/202,584, filed on Jun. 17, 2021, which is incorporated herein by reference in its entirety.

FIELD OF THE INVENTION

The present invention relates to methods and systems for alleviating the effects of solar resource intermittency by using energy storage to smooth the output curve of a solar energy system, and in particular to using short-term solar resource forecasting to improve the smoothing.

BACKGROUND

Achieving a diversified low-carbon emissions energy economy has been limited by economic and technological limitations. Intermittency of renewable energy resources such as solar irradiance can made it difficult for electric grids to accept power from some solar energy systems.

It has been suggested to pair energy storage systems with photovoltaic arrays in order to smooth the output curve of the combined system. However, the high cost of energy storage can make it impractical to deploy enough energy storage for negating the results of the solar resource's intermittency. Methods and systems are needed for achieving a high degree of smoothness and/or reducing the variance of delivered energy during periods of intermittency, which don't require large energy storage systems.

SUMMARY

A method is disclosed, according to embodiments disclosed herein, for operating a solar energy system comprising a photovoltaic array, an inverter, and an energy storage device. The method comprises: (a) accessing irradiance data for a past time period PTP; (b) acquiring an irradiance forecast for a future time period FTP, the future time period FTP characterized by (i) having a length of not more than 15 minutes and (ii) having a cumulative irradiance forecast of between 20% and 80% of clear-sky irradiance; (c) calculating a smoothed energy target-value for an imminent time step TS within the future time period FTP, using the irradiance data for the past time period PTP and the forecasted irradiance for the future time period FTP, and optionally at least one parameter of the photovoltaic array; and (d) during the time step TS, delivering a quantity of energy to the inverter based on the calculated smoothed energy target-value, wherein, when energy produced by the photovoltaic array during the time step TS is in excess of the energy delivered to the inverter, at least a portion of the excess is stored in the energy storage device, and when the energy delivered to the inverter during the time step TS is in excess of energy produced by the photovoltaic array, at least a portion of the excess is drawn from the energy storage device.

In some embodiments, the photovoltaic array can have an output rating of ARRAY_RATING in kWp, and the energy storage device has a storage capacity of STORAGE_CAPACITY in kWh, such that STORAGE_CAPACITY≤0.1 X ARRAY_RATING. In some embodiments, the photovoltaic array can have an output rating of ARRAY_RATING in kWp, and the energy storage device has a storage capacity of STORAGE_CAPACITY in kWh, such that STORAGE_CAPACITY≤0.075 X ARRAY_RATING. In some embodiments, the photovoltaic array can have an output rating of ARRAY_RATING in kWp, and the energy storage device has a storage capacity of STORAGE_CAPACITY in kWh, such that STORAGE_CAPACITY≤0.05 X ARRAY_RATING.

In some embodiments, calculating the smoothed energy target-value for the imminent time step TS can include constraining a rate of change in delivered energy to not more than 10% of the output rating ARRAY_RATING per minute.

In some embodiments, the future time period FTP is characterized by having a cumulative irradiance forecast of between 30% and 80% of clear-sky irradiance, or between 30% and 70% of clear-sky irradiance.

In some embodiments, the future time period FTP can have a length of not more than 12 minutes, or not more than 10 minutes, or not more than 9 minutes, or not more than 8 minutes, or not more than 7 minutes, or not more than 6 minutes, or not more than 5 minutes.

In some embodiments, the time step TS can have a length of not more than 5 minutes, or not more than 4 minutes, or not more than 3 minutes, or not more than 2 minutes, or not more than 1 minute, or not more than 0.5 minutes.

In some embodiments, a length of the past time period PTP can equal the length of the future time period FTP, or can be within ±5% of the length of the future time period FTP, or can be within ±10% of the length of the future time period FTP, or can be within ±15% of the length of the future time period FTP, or can be within ±10% of the length of the future time period FTP.

In some embodiments, the smoothed energy target-value for the imminent time step TS can be based on an average of the irradiance data for the past time period PTP and the irradiance forecast for the future time period FTP. In some embodiments, the average can be a weighted average.

In some embodiments, the method can additionally comprise, after the time step TS: (i) accessing irradiance data for a past time period PTP2 that includes the time step TS; (ii) calculating a second smoothed energy target-value for an imminent time step TS2 within the future time period FTP, using the irradiance data for the past time period PTP2 and the forecasted irradiance for the future time period FTP, and optionally the at least one parameter of the photovoltaic array; and/or (iii) during the time step TS2, delivering a quantity of energy to the inverter based on the calculated second smoothed energy target-value.

In some embodiments, the method can additionally comprise, after the time step TS: (i) accessing irradiance data for a past time period PTP2 that includes the time step TS; (ii) acquiring an irradiance forecast for a future time period FTP2 that excludes the time step TS, the future time period FTP2 being characterized by (i) having a length of not more than 15 minutes and (ii) having a cumulative irradiance forecast of between 20% and 80% of clear-sky irradiance; (iii) calculating a second smoothed energy target-value for an imminent time step TS2 within the future time period FTP2, the second smoothed energy target-value being based on the irradiance data for the past time period PTP2 and the forecasted irradiance for the future time period FTP2, and optionally on the at least one parameter of the photovoltaic array; and/or (iv) during the time step TS2, delivering a quantity of energy to the inverter based on the calculated second smoothed energy target-value.

In some embodiments, a control system for a solar energy system can comprise one or more processors and a computer-readable medium storing program instructions that, when executed by the one or more processors, cause the one or more processors to carry out the method steps of any of the foregoing methods.

In some embodiments, a solar energy system can comprise a photovoltaic array, an inverter, an energy storage device, and a control system that comprises one or more processors and a computer-readable medium storing program instructions that, when executed by the one or more processors, cause the one or more processors to carry out the method steps of any of the foregoing methods.

A method is disclosed, according to embodiments, for operating a solar energy system for the duration of a defined time period DTP comprising a plurality of n time steps $TS_i$. According to the method, the solar energy system comprises a photovoltaic array, an inverter, and an energy storage device having a storage capacity in kWh equal to an output rating in kWp of the photovoltaic array multiplied by no more than 10%. The method comprises, for each one of the n time steps ($TS_1 \ldots TS_n$): (a) no later than the beginning of the time step TSi: (i) accessing irradiance data for a respective past time period PTP, and (ii) acquiring an irradiance forecast for a respective future time period FTP having a length of not more than 15 minutes, the length being equal to 1/x times a length of the defined time period DTP where x is an integer greater than 1, and calculating a smoothed energy target-value for the time step TSi using the irradiance data for the past time period PTP and the forecasted irradiance for the future time period FTP, and optionally at least one parameter of the photovoltaic array. The method further comprises: (b) during the time step $TS_i$, delivering a quantity of energy $QUANT_i$ to the inverter based on the calculated smoothed energy target-value. According to the method, (i) at least one future time period FTP has a cumulative irradiance forecast of between 20% and 80% of clear-sky irradiance and (ii) inclusion of the irradiance forecast in the calculating reduces, by at least 20%, a variance over the n time steps $TS_i$ of the defined time period DTP, of a difference between (A) irradiance values equivalent to delivered quantities of energy $QUANT_i$ and (B) corresponding points on a fully smoothed irradiance curve. In some embodiments, the fully smoothed irradiance curve can be calculated from above-cloud irradiance for each of the n time steps $TS_i$, actual irradiance for the time period DTP, and above-cloud irradiance for the time period DTP. In some embodiments, the fully smoothed irradiance curve can be calculated by multiplying (1) above-cloud irradiance for each of the n time steps TSi by (2) actual irradiance for the time period DTP divided by above-cloud irradiance for the same time period DTP.

In some embodiments, inclusion of the irradiance forecast in the calculating can reduce the variance by at least 30%. In some embodiments, inclusion of the irradiance forecast in the calculating can reduce the variance by at least 40%. In some embodiments, inclusion of the irradiance forecast in the calculating can reduce the variance by at least 50%.

In some embodiments, a control system for a solar energy system can comprise one or more processors and a computer-readable medium storing program instructions that, when executed by the one or more processors, cause the one or more processors to carry out the method steps of any of the foregoing methods.

In some embodiments, a solar energy system can comprise a photovoltaic array, an inverter, an energy storage device, and a control system that comprises one or more processors and a computer-readable medium storing program instructions that, when executed by the one or more processors, cause the one or more processors to carry out the method steps of any of the foregoing methods.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

DETAILED DESCRIPTION OF THE ILLUSTRATED EMBODIMENTS

Figure 1:
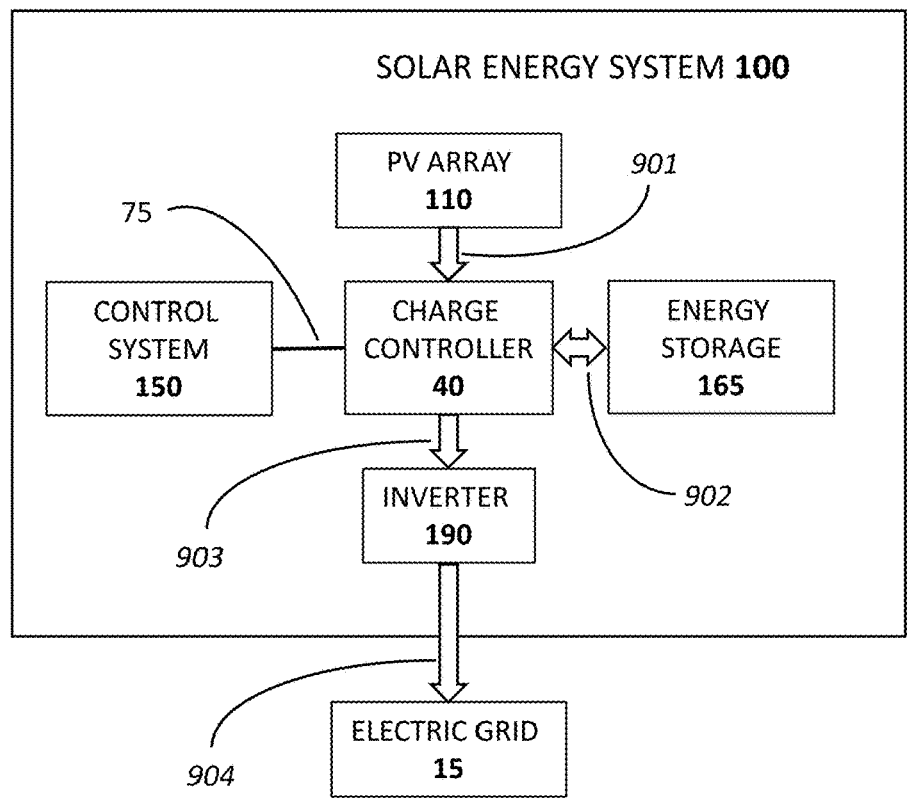
FIG. 1 shows a block diagram of a solar energy system, according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Embodiments disclosed herein relate to providing smoothed output from a solar energy system. A 'solar energy system' as used herein means a system for generating electricity using an array of photovoltaic (PV) modules. The system can include an inverter for converting the direct-current (DC) electricity generated by the PV modules to alternating current (AC) electricity, e.g., for delivery to an electricity grid. The term 'smoothed' (or smoothing, etc.) as used herein generally means that the output of the solar energy system, or, equivalently, the energy delivered internally to an inverter of the solar energy system, has less short-term variation than would naïve photovoltaic conversion of available solar irradiance. A 'smoothed energy target-value (SETV)', as the term is used herein, is a value selected for delivery to the grid or to the inverter of the solar energy system for any given time step, for the purpose of smoothing the delivery curve Referring now to the figures, and in particular to FIG. 1, a solar energy system 100 according to embodiments includes a PV array 110. In embodiments, the PV array 110 can be a fixed-plate array or can include a tracking component, i.e., a solar tracker, for increasing cumulative electricity generated over the course of a period of time.

A solar tracker, or simply 'tracker', is an arrangement that changes the attitude of the PV panels so as to capture, i.e., convert, a higher proportion of the direct irradiance falling on the panels over the course of nearly any given period of time. A single-axis tracker is one that rotates PV panels around a single axis, usually from east to west over the course of a day around a north-south axis. Some single-axis trackers are arranged to rotate about an east-west axis. A double-axis tracker is one that is designed to generally have the PV panels 'face' the sun directly at all times so as to capture and convert the entire amount of available direct irradiance. Some double-axis trackers operate using Euler angles and are not, strictly speaking, rotating the PV panels about two Cartesian axes, but the results are substantially the same.

The inventors have found that the embodiments described herein are effective for both fixed and tracking PV arrays. The skilled artisan will understand that straightforward changes can be made in calculating inputs and outputs of the solar energy system depending on tracking type or presence, for example by adapting a cosine-loss factor for the direct irradiance portion of available solar irradiance in accordance with sun angle and tracking type, while the diffuse irradiance portion of the solar resource can be assumed to be substantially the same for all tracking types.

The solar system 100 of FIG. 1 additionally includes an inverter 190. An inverter can include electronic circuitry, for example for synchronizing the phase, and for matching the voltage and frequency of the power output to those of the grid. The array of PV modules 110 typically has an output rating in kilowatts peak (kWp) which is the maximum DC power output rating for a given set of standard of environmental and operating conditions such as temperature.

As is known in the art, an inverter 189 can have a rating that is lower than the output rating of the array of PV modules. This is usually because the PV array 110 may have a sharp output peak in midday, and configuring the inverter 190 to convert and deliver all of the peak energy would mean that the inverter 190 is not fully utilized during most hours of the day. Thus, the inverter 190 can be designed to 'clip' the peak output of the PV array so as to achieve better utilization of the inverter. This clipping also has a 'smoothing' aspect as there is nearly no intermittency in system output whenever solar irradiance is at or above peak. This kind of automatic smoothing may further improve the 'smoothness' of system output according to the embodiments disclosed herein, but it is not explicitly included in the examples presented herein.

According to embodiments, smoothing can be accomplished by providing an energy storage device as a component in the solar energy system 100, such as the energy storage device 165 of FIG. 1, which can include a rechargeable battery or capacitor. A 'smoothed' output value, e.g., an SETV, can be achieved for any given time step when there is excess energy available relative to the SETV, by using the energy storage device to absorb, i.e., store, output of the PV array 110 in excess of the SETV. A 'smoothed' output value can also be achieved for any given time step when energy available from the PV array is lower than the SETV, by using the energy storage device to discharge energy 'missing' from the output of the PV array 110 relative to the SETV.

The energy storage device 165 can be configured to facilitate smoothing in accordance with one of a number of examples described in the following paragraphs.

In a first example, the energy storage device 165 can be used to achieve a constant, linear output throughout a solar day and even beyond. According to the example, such an energy storage device 165 must be large enough to store and discharge half or even more of a day's projected PV output, and providing such a large energy storage device 165 would generally make the solar energy system not economical.

In a second example, smoothed output can be made to follow an 'ideal' smoothed curve, the term being used to mean a fully-smoothed curve that follows the availability of clear-sky irradiance. Clear-sky irradiance, or 'above-the-clouds' irradiance, can be predicted quite accurately for any hour of any day of the year, and is based on sun angle and not on terrestrial weather conditions. An ideal smoothed curve, according to embodiments, can include a factor, e.g., a daily factor, for terrestrial meteorological conditions as applied to the clear-sky irradiance. Ideal smoothed curves are discussed further below with reference to FIGS. 7-10. While an energy storage device according to the second example would be likely to be smaller than the energy storage device of the first example, operating in accordance with the second example is nevertheless likely to be uneconomical because of the high cost of energy storage sufficient to achieve an ideal smoothed curve.

In a third example, a 'small' energy storage device 165 can be provided. According to embodiments, 'small' energy storage devices 165 for a solar energy system 100 comprising a PV array 110 having an output rating of ARRAY_RATING in kWp include energy storage devices 165 with a storage capacity STORAGE_CAPACITY in kWh such that STORAGE_CAPACITY$\leq$0.1 X ARRAY_RATING. To illustrate: a PV array 110 having an output rating of 10 kWp can be provided together with an energy storage device 165 having storage capacity that is less than or equal to 1 kWh. In some embodiments, 'small' energy storage devices 165 for a solar energy system comprising a PV array 110 having an output rating of ARRAY_RATING in kWp include energy storage devices 165 with a storage capacity STORAGE_CAPACITY in kWh such that STORAGE_CAPACITY$\leq$0.075 X ARRAY_RATING—e.g., less than 0.75 kWh for a 10 kWp PV system. In some embodiments, 'small' energy storage devices 165 for a solar energy system 100 comprising a PV array 110 having an output rating of ARRAY_RATING in kWp include energy storage devices 165 with a storage capacity STORAGE_CAPACITY in kWh such that STORAGE_CAPACITY≤0.05 X ARRAY_RATING—e.g., less than 0.5 kWh for a 10 kWp PV system.

In embodiments, when deploying a small energy device 165, e.g., an energy device 165 of the third example having a discharge capacity equivalent to a fraction of an hour, selection of SETV's can be improved by incorporating the most recent actual irradiance data at the time of selecting the SETV. The actual irradiance in a most recent past time period PTP is generally an accurate indicator of most recent terrestrial meteorological conditions, e.g., cloud cover, and, with varying degrees of accuracy, can also be a predictor of terrestrial meteorological conditions for an imminent future time period. A past time period PTP can be as short as 5, 10 or 15 minutes, or as long as 30, 45 or 60 minutes. An SETV can be calculated using the actual irradiance data from the past time period PTP: For example, the SETV for a given imminent time step can be based on an average of the actual irradiance over the past time period PTP. Alternatively, the SETV for a given imminent time step can be based on actual irradiance derived from data of the past time period PTP and weighted, e.g., for recency. The latter example may be used, for example, to put a higher weight on the most recent portion of the actual irradiance data.

The term "time step" as used herein refers to a short period of time, i.e., a period of time that is not longer than 1 minute, or not longer than 2 minutes, or not longer than 3 minutes, or not longer than 4 minutes, or not longer than 5 minutes. A time step (TS, or $TS_i$ when referring to a single time step of a series of time steps) is that period of time beginning when an SETV is selected according to any of the embodiments herein for selecting SETV's. In some embodiments, a time step TS begins immediately after the end of a past time period PTP.

A charge controller 40 can be provided to mediate between the PV array 110, the inverter 190, and the energy storage device 165, to regulate the charging and discharging processes of the energy storage device 165 and to ensure correct charging and prevent overcharging. According to embodiments, the charge controller 40 is in data communication with a control system 150 via communications link 75. The control system 150 and charge controller 40 are shown schematically for purpose of illustration as separate elements; however, in some embodiments, the charge controller 40 is part of the control system 150, and in some other embodiments, the control system 150 is part of the charge controller 40. In further embodiments, the control system 150 and charge controller 40 form a single integrated unit. In still further embodiments, either or both of the control system 150 and charge controller 40 can located in, and/or integrated in, the inverter 190.

FIG. 1 further illustrates a non-limiting example of a power flow scheme for a solar energy system 100: power generated by the PV array 110 flows to the charge controller 40 as indicated by arrow 901. Two-way power flow takes place between the charge controller 40 and the energy storage device 165, as indicated by two-way arrow 902. Power from the PV array 110 and the energy storage device 165 flows through the charge controller 40 to the inverter 190, as indicated by arrow 903. The inverter 190 delivers energy to the electric grid 15, as indicated by arrow 904.

Figure 2:
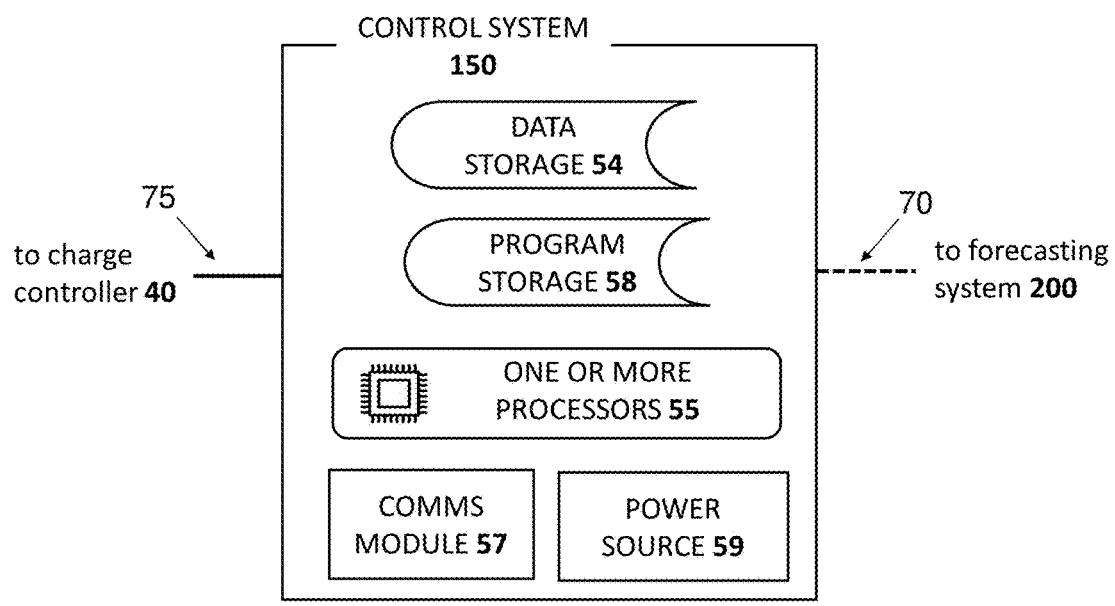
FIG. 2 shows a block diagram of a control system for a solar energy system, according to embodiments of the present invention.

Referring now to FIG. 2, a control system 150 according to embodiments is illustrated schematically to show selected components. The exemplary control system 150 of FIG. 2 includes one or more computer processors 55, a computer-readable storage medium 58, a communications module 57, and a power source 59. The computer-readable storage medium 58 can include transient and/or transient storage, and can include one or more storage units, all in accordance with desired functionality and design choices. The storage 58 can be used for any one or more of: storing program instructions, in firmware and/or software, for execution by the one or more processors 55 of the control system 150. In embodiments, the stored program instructions include program instructions for operating a solar energy system 100. Data storage 54, if separate from storage 58, can be provided for historical data, e.g., actual irradiance and/or forecast values, e.g., forecasted irradiance values, and other data related to the operation of the solar energy system 100. In some embodiments, the two storage modules 54, 58 form a single module. The communications module 59 is configured to establish communications links, e.g., via communication arrang3ments 70 with a forecasting system 200 (described below and illustrated schematically in FIG. 3), and with the charge controller 40 via communications arrangements 75. In some embodiments, a control system 150 does not necessarily include all of the components shown in FIG. 2. The terms "communications arrangements" or similar terms such as "communications links" as used herein mean any wired connection or wireless connection via which data communications can take place. Non-limiting and non-exhaustive examples of suitable technologies for providing communications arrangements include any short-range point-to-point communication system such as IrDA, RFID (Radio Frequency Identification), TransferJet, Wireless USB, DSRC (Dedicated Short Range Communications), or Near Field Communication; wireless networks (including sensor networks) such as: ZigBee, EnOcean; Wi-fi, Bluetooth, TransferJet, or Ultra-wideband; and wired communications bus technologies such as. CAN bus (Controller Area Network, Fieldbus, FireWire, HyperTransport and InfiniBand.

Figure 3:
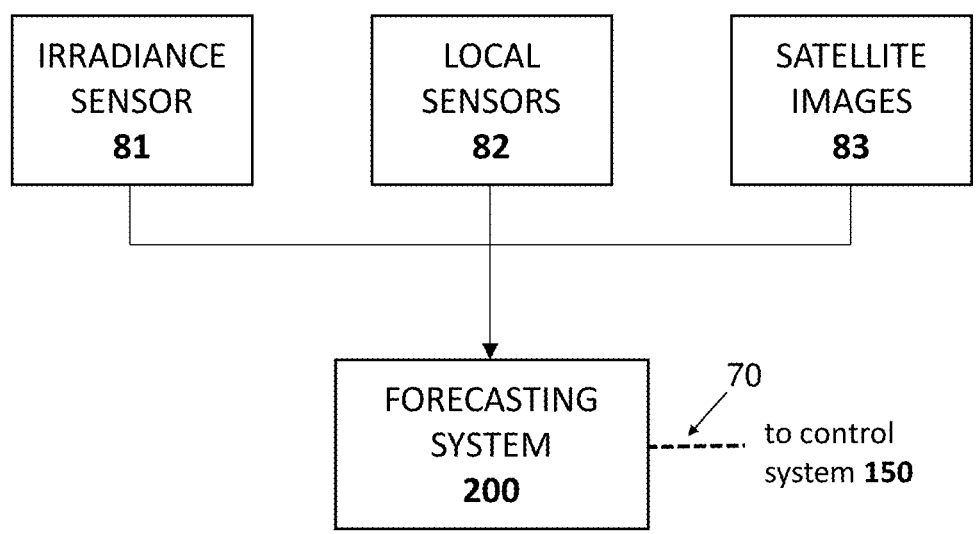
FIG. 3 shows a block diagram relating to a forecasting process, according to embodiments of the present invention.

FIG. 3 shows examples of components, according to embodiments, provided for working with a short-term forecasting system 200. The non-exhaustive list of components includes one or more irradiance sensors 81, local meteorological sensors 82, and a source of satellite imagery 83. According to embodiments disclosed herein, selection of SETV's can be further improved by incorporating a short-term irradiance forecast for a future time period FTP in the SETV calculation or other selection process, in addition to the actual irradiance data of the past time period PTP described hereinabove. A future time period FTP having a short-term forecast available from the forecasting system 200 can be as short as 5, 10 or 15 minutes, or as long as 30, 45 or 60 minutes. In a non-limiting example, future time period FTP begins at a time of calculating and/or selecting an SETV for an imminent time step TS, and thus that time step TS represents the first portion of the FTP. To illustrate: a future time period FTP of 10 minutes can begin with a first time-step TS of 1 minute.

Figure 4:
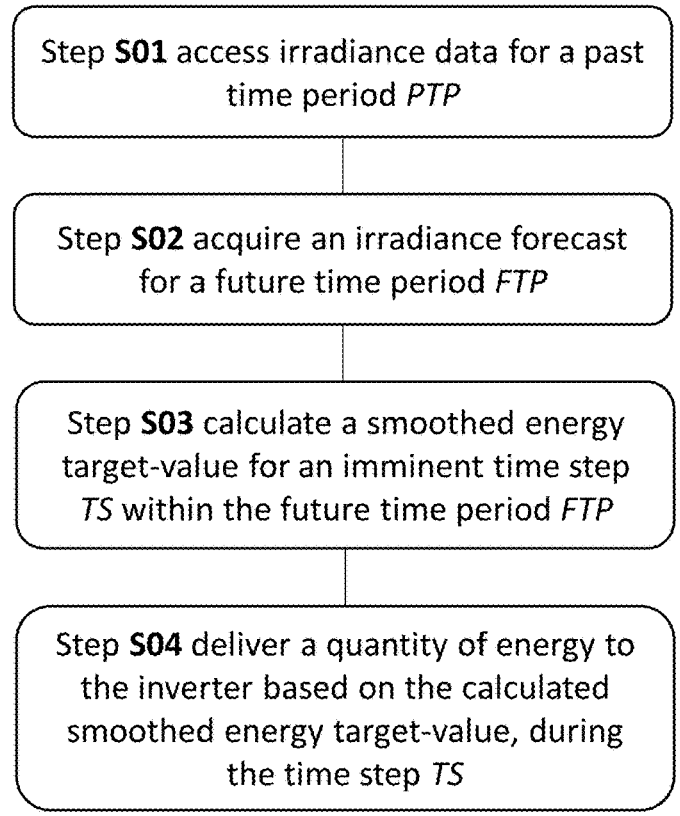
FIGS. 4, 5 and 6 show flowcharts of methods and method steps for operating a solar energy system, according to embodiments of the present invention.

Referring now to FIG. 4, a method is disclosed for operating a solar energy system 100, e.g., the solar energy system 100 of FIG. 1. According to the method, the solar energy system 100 comprises a PV array 110, an inverter 190, and an energy storage device 165. In some embodiments of the method, the PV array has an output rating of ARRAY_RATING in kWp, and the energy storage device has a storage capacity of STORAGE_CAPACITY in kWh, and the STORAGE_CAPACITY is less than or equal to 0.1 times the ARRAY_RATING, or the STORAGE_CAPACITY is less than or equal to 0.075 times the ARRAY_RATING, or the STORAGE_CAPACITY is less than or equal to 0.05 times the ARRAY_RATING.

As illustrated by the flow chart in FIG. 4, the method comprises 4 method steps S01, S02, S03, and S04. In embodiments, some or all of the steps of the method can be carried out by the control system 150 of the solar energy system 100.

Step S01 includes: accessing irradiance data for a past time period PTP.

Step S02 includes: acquiring an irradiance forecast for a future time period FTP. The future time period FTP is characterized by having a length of not more than 15 minutes and by having a cumulative irradiance forecast of between 20% and 80% of clear-sky irradiance. In some embodiments, the future time period FTP is characterized by having a cumulative irradiance forecast of between 30% and 80% of clear-sky irradiance. In some embodiments, the future time period FTP has a length of not more than 10 minutes. In some embodiments, the length of the past time period PTP equals the length of the future time period FTP.

Step S03 includes: calculating an SETV for an imminent time step TS within the future time period FTP, using the irradiance data for the past time period PTP and the forecasted irradiance for the future time period FTP, and optionally at least one parameter of the PV array 110 (such as, for example, a conversion efficiency of the PV array 110 for a given set of environmental parameters). In some embodiments, the time step TS has a length of not more than 2 minutes, or not more than 1 minute. In some embodiments, the SETV for the imminent time step TS is based on an average of the irradiance data for the past time period PTP and the irradiance forecast for the future time period FTP. In some embodiments, the average is a weighted average, e.g., where one of the PTP and the FTP is given greater weight, and/or greater weight per length of respective time period.

Step S04 includes: delivering a quantity of energy, e.g., to the inverter 190, during the time step TS, based on the SETV calculated in Step S03. According to the method, when energy produced by the PV array 110 during the time step TS is in excess of the energy delivered to the inverter 190, at least a portion of the excess is stored in the energy storage device 165, and when the energy delivered to the inverter 190 during the time step TS is in excess of energy produced by the PV array 110, at least a portion of the excess is drawn from the energy storage device 165.

Figure 5:
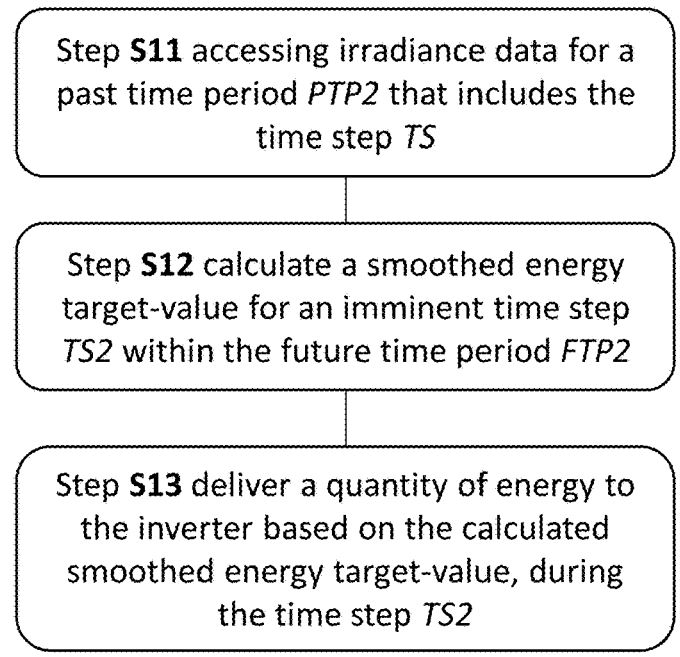

In some embodiments, the method additionally comprises method steps S11, S12, and S13, which are illustrated by the flow chart in FIG. 5. Generally speaking, steps S11, S12, and S13 embody steps for continuing the method after the passage of the first time step TS with the performing of Step S04.

Step S11 includes: accessing irradiance data for a past time period PTP2 that includes the time step TS—in other words, the time step TS that marked the start of the future time period FTP in Step S03 is now 'in the past', i.e., the duration of the time step TS has passed by with the performing of Step S04, and thus the data of that same time step TS is now included in the 'new', or most recent, past time period PTP2.

Step S12 includes: calculating a second SETV for an imminent time step TS2 within the future time period FTP, using the irradiance data for the past time period PTP2 and the forecasted irradiance for the future time period FTP, and optionally the at least one parameter of the PV array 110 (such as, for example, a conversion efficiency of the PV array 110 for a given set of environmental parameters). In other words, according to Step S12, once the first time step TS has passed by in Step S04, a new time step TS2 is imminent, e.g., starting immediately after time step TS, within the same future time period FTP—and the forecast for the future time period FTP is not updated.

Step S13 includes: delivering a quantity of energy to the inverter 190 during the second time step TS2, based on the second SETV calculated in Step S12.

Figure 6:
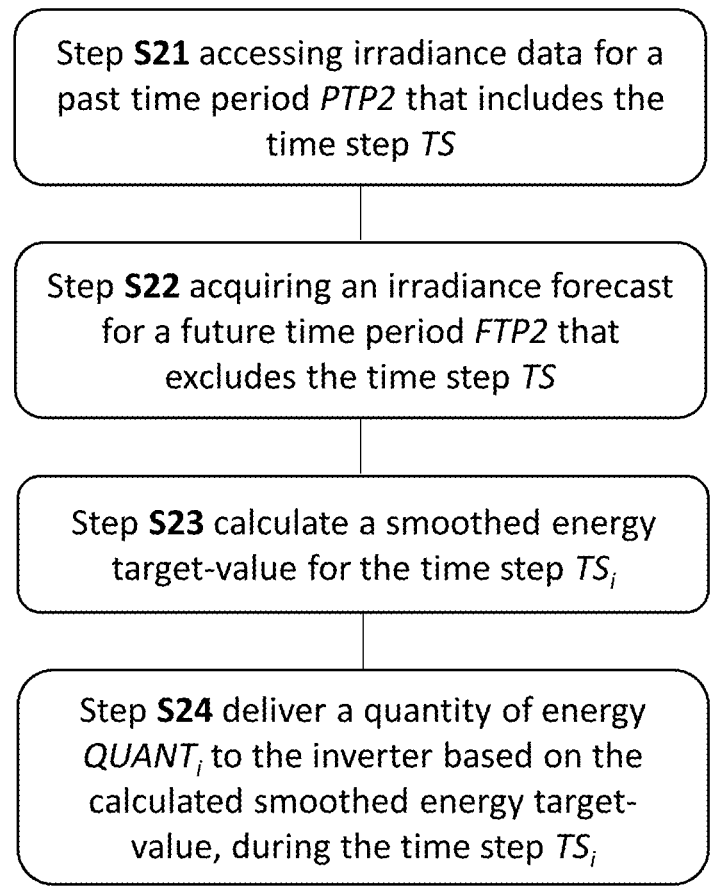

In some embodiments, the method additionally comprises method steps S21, S22, and S23, which are illustrated by the flow chart in FIG. 6. Generally speaking, steps S21, S22, S23, and S24 embody steps for continuing the method after the passage of the first time step TS with the performing of Step S04.

Step S21 includes: accessing irradiance data for a past time period PTP2 that includes the time step TS—as in Step S11, the time step TS that marked the start of the future time period FTP in Step S03 is now 'in the past', i.e., the duration of the time step TS has passed by with the performing of Step S04, and thus the data of that same time step TS is now included in the 'new', or most recent, past time period PTP2.

Step S22 includes: acquiring an irradiance forecast for a future time period FTP2 that excludes the time step TS, the future time period FTP2 being characterized by (i) having a length of not more than 15 minutes and (ii) having a cumulative irradiance forecast of between 20% and 80% of clear-sky irradiance. In some embodiments, the future time period FTP2 is characterized by having a cumulative irradiance forecast of between 30% and 80% of clear-sky irradiance. In some embodiments, the future time period FTP2 has a length of not more than 10 minutes. In some embodiments, the length of the future time period FTP2 equals the length of the future time period FTP. In some embodiments, the length of the future time period FTP2 equals the length of the past time period PTP2. In other words, once the first time step TS has passed by with the performance of Step S04, a new future time period FTP2 and corresponding new or updated forecast will be used for the SETV calculation of the following step(s).

Step S23 includes: calculating a second SETV for an imminent time step TS2 within the future time period FTP2, the second SETV being based on the irradiance data for the past time period PTP2 and the forecasted irradiance for the future time period FTP2, and optionally on the at least one parameter of the PV array 110 (such as, for example, a conversion efficiency of the PV array 110 for a given set of environmental parameters). In some embodiments, a new irradiance forecast is acquired for a new future time period with each new time step TS.

Step S24 includes: delivering a quantity of energy to the inverter 190 during the second time step TS2, based on the second SETV calculated in Step S23.

The skilled artisan will understand that performance of steps S21, S22, S23, and S24 is an alternative to performing steps S11, S12, and S13; inter alia, a new or updated irradiance forecast is acquired in step S22 after the passage of the first time step TS, which does not occur in the method steps S11, S12, and S13.

In some embodiments, the calculating of an SETV in any or all of Steps S03, S12 and S23 for a respective imminent time step TS includes constraining a rate of change in delivered energy to not more than 10% of the output rating ARRAY_RATING per minute. In some embodiments, this constraining includes constraining the calculation of the SETV.

We now refer to FIGS. 7, 8, 9 and 10, which show graphs of computer-modeled output of a solar energy system according to embodiments. For the graphs of FIGS. 7-10, the model used a 12-hour solar day in which 44% of clear-sky irradiance (above-the-clouds irradiance) was available to the PV array as actual irradiance.

Figure 7:
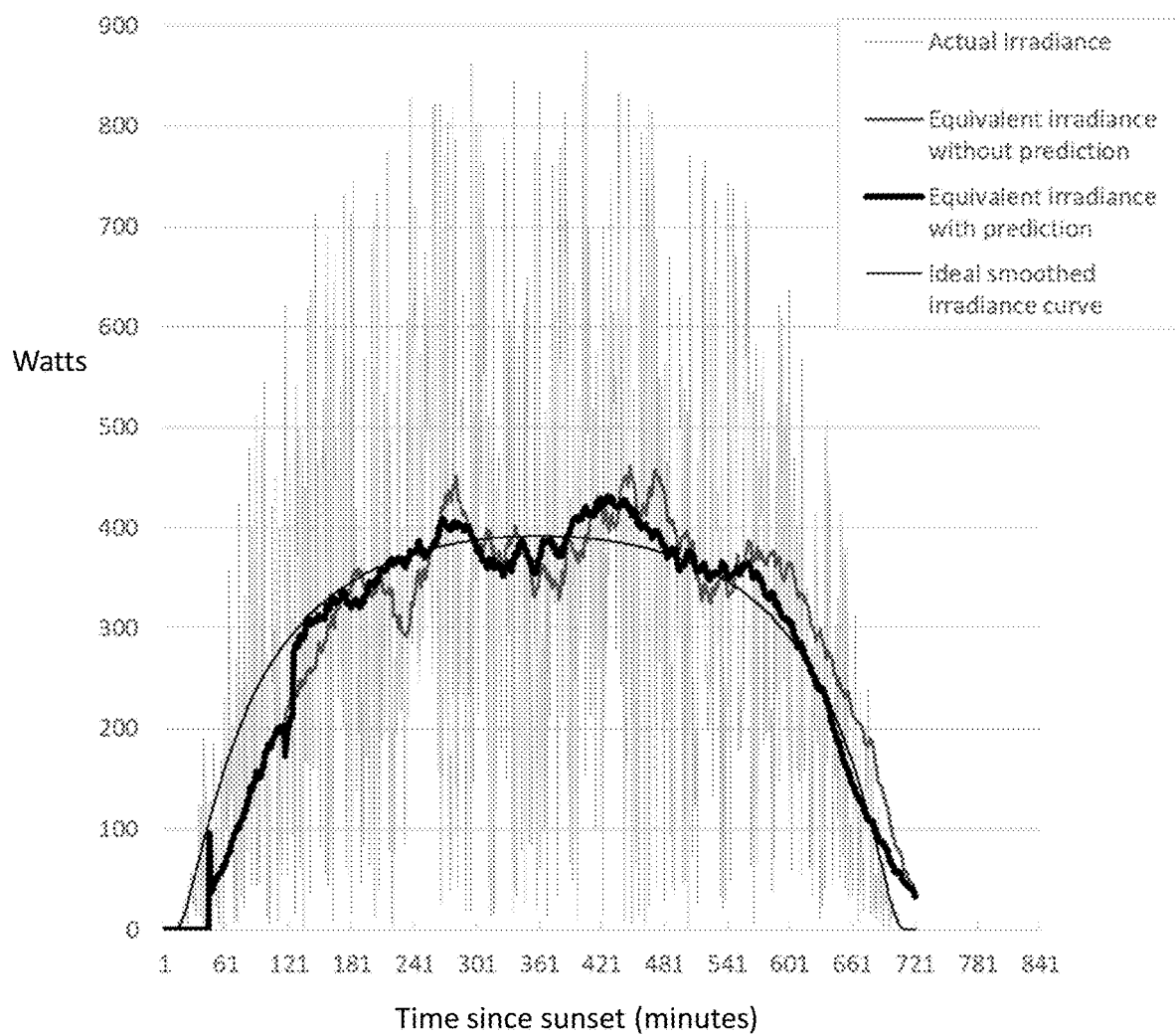
FIG. 7 shows a comparative graph, based on computer modeling, of irradiance values equivalent to delivered quantities of energy, with and without prediction of future irradiance values, for past-performance and future-forecast time periods of 15 minutes each, according to embodiments of the present invention.

The actual irradiance data is plotted in FIG. 7 to show the very high levels of intermittency throughout the solar day. An ideal smoothed irradiance curve (of the second energy-storage device example above) is shown, calculated as follows: Each point in a clear-sky irradiance curve (not shown), was multiplied by the 44% average actual-irradiance-to-clear-sky-irradiance ratio. Since the energy under this curve represents the total energy of the solar resource that is available for the day, adherence to this curve represents hypothetical full, or ideal, smoothing. 'Equivalent' irradiance values were calculated (using PV array conversion efficiencies and given environmental values) to represent the actual delivered quantities of energy that would be based on SETV calculations, using actual irradiance data from a past time period (PTP). Two curves in FIG. 7 represent the calculation, respectively with and without prediction (acquired forecast, e.g., a short-term forecast acquired from a forecasting system) of future irradiance values for future time periods (FTP). Both the past-performance and future-forecast time periods used for the graphs in FIG. 7 are of 45 minutes length.

Figure 8:
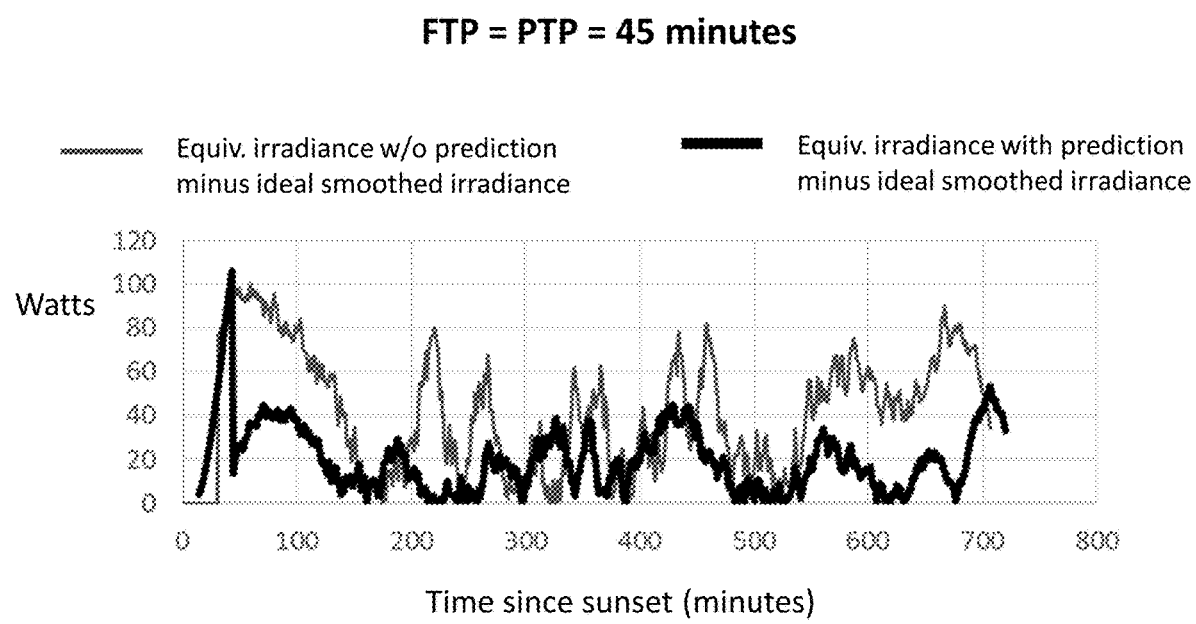
FIG. 8 shows a comparative graph, based on computer modeling, of the equivalent irradiance with and without prediction of FIG. 7, minus ideal smoothed irradiance values, according to embodiments of the present invention.

One can discern from the graph in FIG. 7 that the 'with prediction' curve diverges less from the ideal smoothed curve, and this distinction is easier to see in FIG. 8, which shows only the divergence values, i.e., the irradiance-equivalents of the SETV's minus the 'ideal smoothed' values for both 'without prediction' and 'with prediction'. In fact, the variance of the 'with prediction' curve in FIG. 8 is more than 50% lower than the variance of the 'without prediction' curve. In other examples (using irradiance values for a different day or partial day), the variance of the 'with prediction' curve was found to be lower than the variance of the 'without prediction' curve by at least 20%, or by at least 30%, or by at least 40%, even for time periods that were equivalent to small multiples, e.g., integers greater than 1, of the modeled FTP length.

Figure 9:
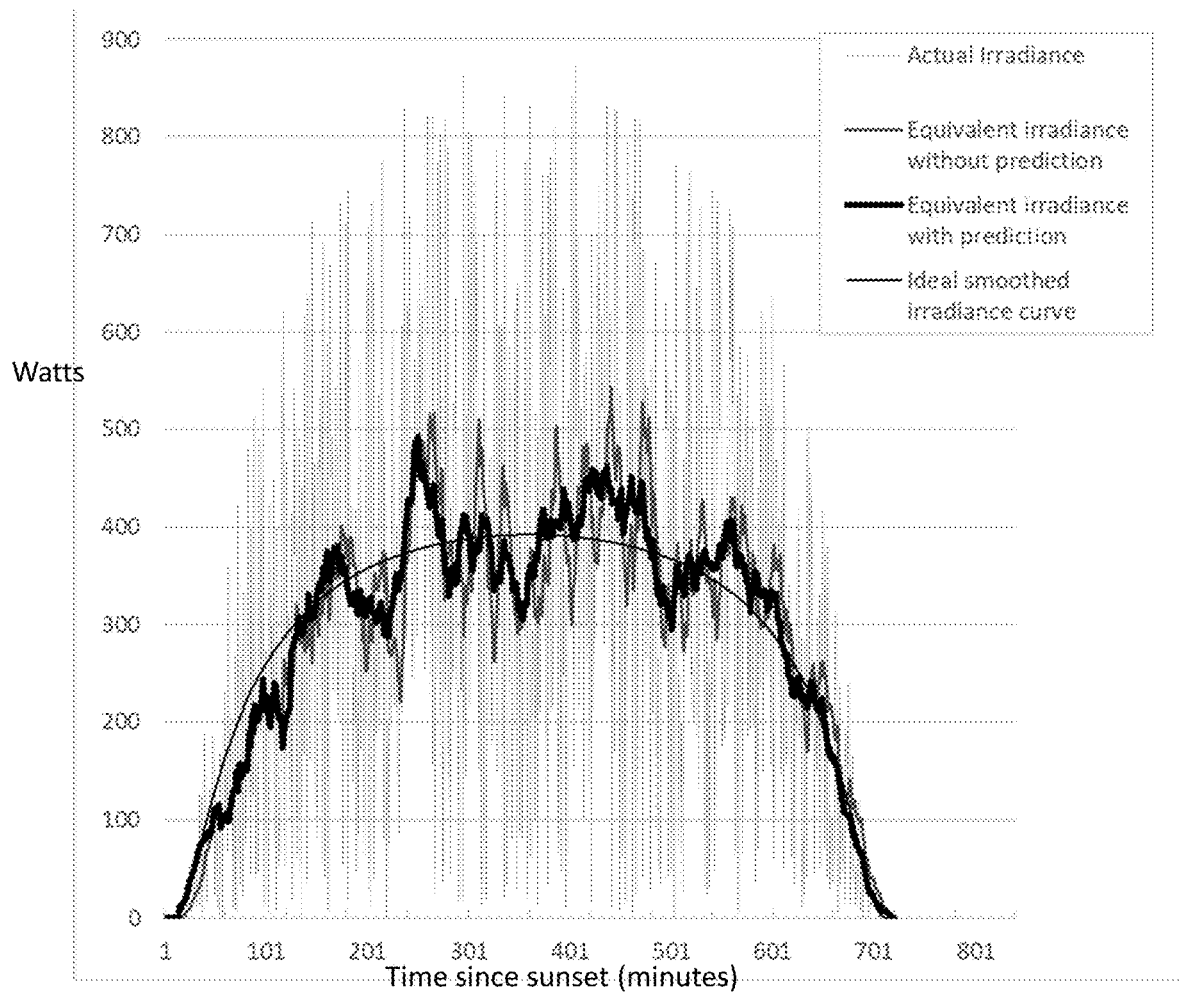
FIG. 9 shows a comparative graph, based on computer modeling, of irradiance values equivalent to delivered quantities of energy, with and without prediction of future irradiance values, for past-performance and future-forecast time periods of 45 minutes each, according to embodiments of the present invention, according to embodiments of the present invention.
Figure 10:
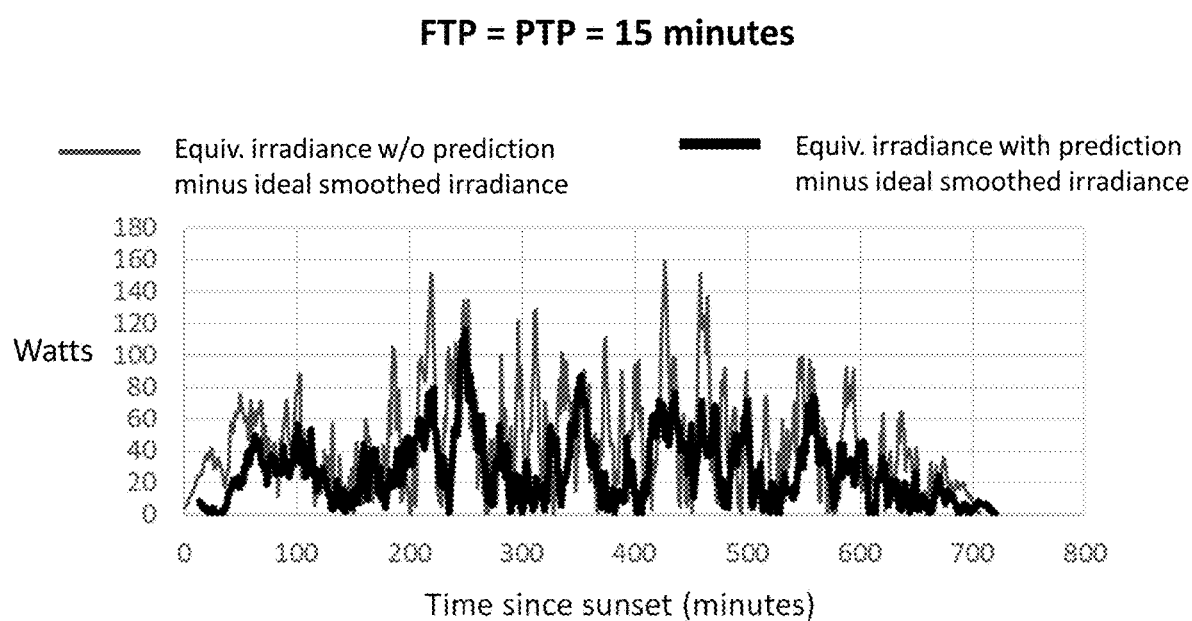
FIG. 10 shows a comparative graph, based on computer modeling, of the equivalent irradiance with and without prediction of FIG. 9, minus ideal smoothed irradiance values, according to embodiments of the present invention.

FIGS. 9 and 10 are analogous to FIGS. 7 and 8, respectively, but show modeled results for past-performance and future-forecast time periods of 15 minutes. As could be expected, the residual intermittency of 15-minute PTP and FTP periods is greater than that of 45-minute periods, but is likely to be a truer representation of actual system performance according to the embodiments disclosed herein. Here, too, the variances of the respective divergence curves in FIG. 10 followed the pattern as in FIG. 8: the variance of the 'with prediction' curve was more than 50% lower than the variance of the 'without prediction' curve.

Figure 11:
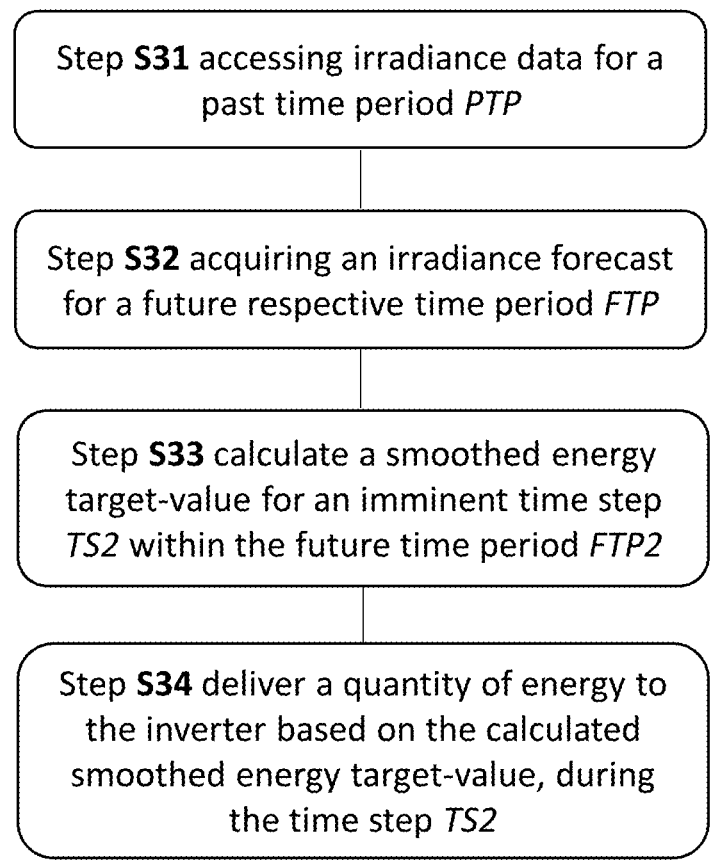
FIG. 11 shows a flowchart of a method for operating a solar energy system, according to embodiments of the present invention.

Referring now to FIG. 11, a method is disclosed for operating a solar energy system 100 for the duration of a defined time period DTP comprising a plurality of n time steps $TS_i$. According to the method, the solar energy system 100 comprises a PV array 110, an inverter 190, and an energy storage device 165 having a storage capacity in kWh equal to an output rating in kWp of the photovoltaic array multiplied by no more than 10%. The method comprising, for each one of the n time steps ($TS_1 \ldots TS_n$), 4 method steps S31, S32, S33, and S34.

In embodiments, some or all of the steps of the method can be carried out by the control system 150 of the solar energy system 100.

According to the method, Steps S31, S32, and S33 are carried out no later than the beginning of the time step TSi.

Step S31 includes: accessing irradiance data for a respective past time period PTP.

Step S32 includes: acquiring an irradiance forecast for a respective future time period FTP having a length of not more than 15 minutes, the length being equal to 1/x times a length of the defined time period DTP where x is an integer greater than 1.

Step S33 includes: calculating an SETV for the time step TSi using the irradiance data for the past time period PTP and the forecasted irradiance for the future time period FTP, and optionally at least one parameter of the photovoltaic array (such as, for example, a conversion efficiency of the PV array 110 for a given set of environmental parameters).

Step S34 is carried out during the time step $TS_i$, and includes: delivering a quantity of energy $QUANT_i$ to the inverter 190 based on the SETV calculated in Step S33.

According to the method, at least one future time period FTP has a cumulative irradiance forecast of between 20% and 80% of clear-sky irradiance, or between 30% and 80% of clear-sky irradiance. Inclusion of the irradiance forecast in the calculating reduces, by at least 20%, a variance over the n time steps $TS_i$ of the defined time period DTP, of a difference between (A) irradiance values equivalent to delivered quantities of energy $QUANT_i$ and (B) corresponding points on a fully smoothed irradiance curve. In some embodiments, inclusion of the irradiance forecast in the calculating reduces the variance by at least 50%. In some embodiments, the fully smoothed irradiance curve is calculated from above-cloud irradiance for each of the n time steps $TS_i$, actual irradiance for the time period DTP, and above-cloud irradiance for the time period DTP, as was discussed hereinabove in connection with FIGS. 7-10.

Any of the method steps disclosed herein can be combined with any other method steps, any such combinations being within the scope of the embodiments. Any of the disclosed embodiments can be combined in any practical manner. In any of the disclosed methods, not all of the steps need be performed. Any of the steps of any of the disclosed methods can be combined in any way to create combinations not explicitly disclosed and any such combinations are within the scope of the invention.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A method of operating a solar energy system, the solar energy system comprising a photovoltaic array, an inverter, and an energy storage device, the method comprising:
   a. accessing irradiance data for a past time period PTP;
   b. acquiring an irradiance forecast for a future time period FTP, the future time period FTP characterized by (i) having a length of not more than 15 minutes and (ii) having a cumulative irradiance forecast of between 20% and 80% of clear-sky irradiance;
   c. calculating a smoothed energy target-value for an imminent time step TS within the future time period FTP, using the irradiance data for the past time period PTP and the forecasted irradiance for the future time period FTP; and d. during the time step TS, delivering a quantity of energy to the inverter based on the calculated smoothed energy target-value, wherein, when energy produced by the photovoltaic array during the time step TS is in excess of the energy delivered to the inverter, at least a portion of the excess is stored in the energy storage device, and when the energy delivered to the inverter during the time step TS is in excess of energy produced by the photovoltaic array, at least a portion of the excess is drawn from the energy storage device.

2. The method of claim 1, wherein the photovoltaic array has an output rating of ARRAY_RATING in kWp, and the energy storage device has a storage capacity of STORAGE_CAPACITY in kWh, such that STORAGE_CAPACITY≤0.1 X ARRAY_RATING.

3. The method of claim 2, wherein calculating the smoothed energy target-value for the imminent time step TS includes constraining a rate of change in delivered energy to not more than 10% of the output rating ARRAY_RATING per minute.

4. The method of claim 1, wherein the photovoltaic array has an output rating of ARRAY_RATING in kWp, and the energy storage device has a storage capacity of STORAGE_CAPACITY in kWh, such that STORAGE_CAPACITY≤0.075 X ARRAY_RATING.

5. The method of claim 1, wherein the photovoltaic array has an output rating of ARRAY_RATING in kWp, and the energy storage device has a storage capacity of STORAGE_CAPACITY in kWh, such that STORAGE_CAPACITY≤0.05 X ARRAY_RATING.

6. The method of claim 1, wherein the future time period FTP is characterized by having a cumulative irradiance forecast of between 30% and 80% of clear-sky irradiance.

7. The method of claim 1, wherein the future time period FTP has a length of not more than 10 minutes.

8. The method of claim 1, wherein the time step TS has a length of not more than 2 minutes.

9. The method of claim 1, wherein a length of the past time period PTP equals the length of the future time period FTP.

10. The method of claim 1, wherein the smoothed energy target-value for the imminent time step TS is based on an average of the irradiance data for the past time period PTP and the irradiance forecast for the future time period FTP.

11. The method of claim 10, wherein the average is a weighted average.

12. The method of claim 1, additionally comprising, after the time step TS:
  i. accessing irradiance data for a past time period PTP2 that includes the time step TS;
  ii. calculating a second smoothed energy target-value for an imminent time step TS2 within the future time period FTP, using the irradiance data for the past time period PTP2 and the forecasted irradiance for the future time period FTP; and
  iii. during the time step TS2, delivering a quantity of energy to the inverter based on the calculated second smoothed energy target-value.

13. The method of claim 1, additionally comprising, after the time step TS:
  i. accessing irradiance data for a past time period PTP2 that includes the time step TS;
  ii. acquiring an irradiance forecast for a future time period FTP2 that excludes the time step TS, the future time period FTP2 being characterized by (i) having a length of not more than 15 minutes and (ii) having a cumulative irradiance forecast of between 20% and 80% of clear-sky irradiance;
  iii. calculating a second smoothed energy target-value for an imminent time step TS2 within the future time period FTP2, the second smoothed energy target-value being based on the irradiance data for the past time period PTP2 and the forecasted irradiance for the future time period FTP2; and
  iv. during the time step TS2, delivering a quantity of energy to the inverter based on the calculated second smoothed energy target-value.

14. A control system for a solar energy system, comprising one or more processors and a non-transient computer-readable medium storing program instructions that, when executed by the one or more processors, cause the one or more processors to carry out the method of claim 1.

15. A solar energy system comprising a photovoltaic array, an inverter, an energy storage device, and a control system, the control system comprising one or more processors and a non-transient computer-readable medium storing program instructions that, when executed by the one or more processors, cause the one or more processors to carry out the method of claim 1.

16. A method for operating a solar energy system for the duration of a defined time period DTP comprising a plurality of n time steps $TS_i$, the solar energy system comprising a photovoltaic array, an inverter, and an energy storage device having a storage capacity in kWh equal to an output rating in kWp of the photovoltaic array multiplied by no more than 10%, the method comprising, for each one of the n time steps ($TS_1 \ldots TS_n$):
  a. No later than the beginning of the time step TSi:
    i. accessing irradiance data for a respective past time period PTP;
    ii. acquiring an irradiance forecast for a respective future time period FTP having a length of not more than 15 minutes, the length being equal to 1/x times a length of the defined time period DTP where x is an integer greater than 1;
    iii. calculating a smoothed energy target-value for the time step TSi using the irradiance data for the past time period PTP and the forecasted irradiance for the future time period FTP, and optionally at least one parameter of the photovoltaic array; and
  b. during the time step $TS_i$, delivering a quantity of energy $QUANT_i$ to the inverter based on the calculated smoothed energy target-value, wherein (i) at least one future time period FTP has a cumulative irradiance forecast of between 20% and 80% of clear-sky irradiance and (ii) inclusion of the irradiance forecast in the calculating reduces, by at least 20%, a variance of: a difference between (A) an irradiance equivalent to delivered quantities of energy $QUANT_i$ and (B) an ideal smoothed irradiance, over the n time steps TSi of the defined time period DTP, the ideal smoothed irradiance being calculated by multiplying (1) above-cloud irradiance for each of the n time steps TSi by (2) actual irradiance for the time period DTP divided by above-cloud irradiance for the time period DTP.

17. The method of claim 16, wherein inclusion of the irradiance forecast in the calculating reduces the variance by at least 30%.

18. The method of claim 16, wherein inclusion of the irradiance forecast in the calculating reduces the variance by at least 50%.

19. A control system for a solar energy system, comprising one or more processors and a non-transient computer-readable medium storing program instructions that, when executed by the one or more processors, cause the one or more processors to carry out the method of claim 16.

20. A solar energy system comprising a photovoltaic array, an inverter, an energy storage device, and a control system, the control system comprising one or more processors and a non-transient computer-readable medium storing program instructions that, when executed by the one or more processors, cause the one or more processors to carry out the method of claim 16.

* * * * *